UNITED STATES PATENT OFFICE.

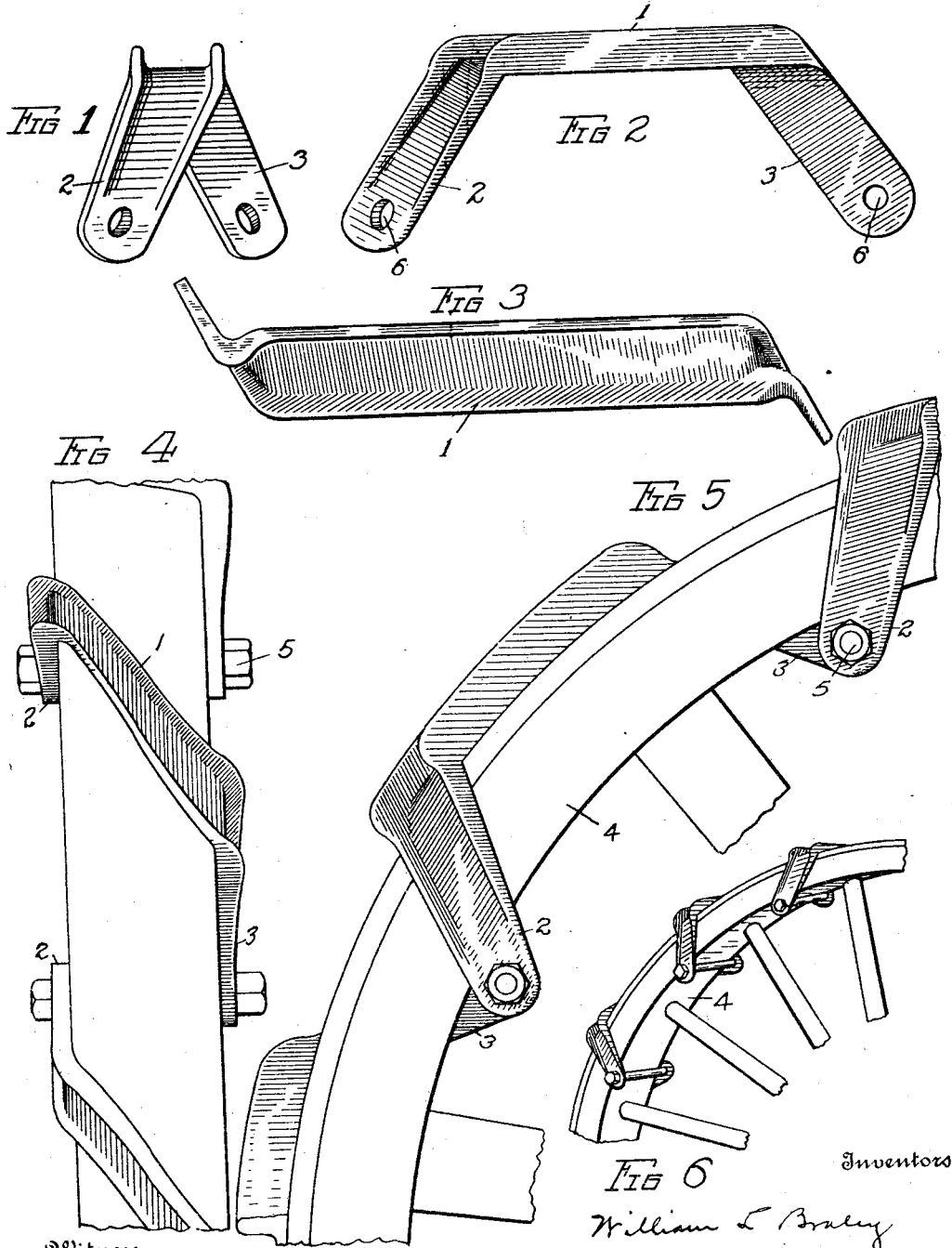

WILLIAM L. BRALEY AND HENRY N. FAAS, OF SPRINGFIELD, OHIO, ASSIGNORS TO THE AMERICAN SEEDING MACHINE COMPANY, OF SPRINGFIELD, OHIO, A CORPORATION OF OHIO.

TRACTOR-WHEEL.

1,184,719.        Specification of Letters Patent.        Patented May 30, 1916.

Application filed February 7, 1916. Serial No. 76,769.

*To all whom it may concern:*

Be it known that we, WILLIAM L. BRALEY and HENRY N. FAAS, citizens of the United States, residing at Springfield, in the county of Clark and State of Ohio, have invented certain new and useful Improvements in Tractor-Wheels, of which the following is a specification.

This invention relates to improvements in tractor attachments for wheels, the attachments being more particularly adapted for the wheels of farm implements.

The object of the invention is to provide an attachment of the character referred to which can be quickly and readily attached to wheels now in common use and also one which will be effective in operation.

In the accompanying drawings:—

Figure 1 is an end view of one of the bars forming the attachment. Fig. 2 is a side elevation of the same. Fig. 3 is a top plan view of the same. Fig. 4 is a plan view of a portion of the periphery of a wheel showing the attachments applied thereto. Fig. 5 is a side view of the same. Fig. 6 is a perspective view of a portion of a vehicle wheel with the attachments connected therewith.

The tractor attachment embodying the improvements consists of a series of U-shaped diagonally-arranged channel bars, 1 representing the tread portion of each bar and 2 and 3 the side arms, both the tread portion and the side arms being of channel form as shown to not only lend strength to the bar but also to furnish a greater tractive effect to the tread portion thereof. In the formation of the bar the side arms are given a sufficient twist relatively to the tread portion to cause said arms to lie flat against the sides of the wheel rim when installed and to also cause said arms to lie in different transverse planes on opposite sides of the plane of the tread portion as indicated best in Fig. 1. The tread portions of the bars are laid in a diagonal direction across the periphery of the rim 4 of the wheel which brings the lower end of each of the side arms 2 and 3 of each bar substantially in line with the lower end of the side arm of the adjacent bar; but on the opposite side of the rim therefrom. The adjacent arms are then connected by bolts 5 which extend through perforations 6 in the lower ends of the respective side arms and beneath the wheel rim.

While the tread portion and arms of each bar are, as before stated, of channel form on their outer sides, the inner sides thereof, or those sides which lie against the wheel rim, are flat and when the twists are placed in the bar the twist will be of such degree as to cause the arm portions of the bar to lie flatly against the sides of the wheel rim; the degree of twist being determined by the size of the wheel. By the arrangement described they are clamped firmly against the sides of the wheel rim and also form a continuous ring or chain about the periphery thereof so that creeping is prevented and a uniform distance between the tread portions of the bars maintained.

Having thus described our invention, we claim:—

1. In a vehicle wheel, a series of tractor bars, each bar consisting of a tread portion extending diagonally across the periphery of the wheel and side arms extending along the sides of the wheel rim, said side arms being located in different transverse planes and on opposite sides of the plane of the tread portion, and a fastening device extending from one arm of each of said bars to the arm of the adjacent bar on the opposide side of the wheel rim.

2. In a vehicle wheel, a series of tractor bars, each consisting of a tread portion extending diagonally across the periphery of the wheel and having arms at its respective ends extending along the sides of said rim, said arms being twisted so as to lie in different transverse planes on opposite sides of the transverse plane of the said tread portion so as to bring one arm of one bar substantially opposite an arm on an adjacent bar, and bolts extending under the wheel rim for securing the oppositely arranged arms together.

3. In a vehicle wheel, a series of tractor bars, each bar consisting of a channeled tread portion extending diagonally across the periphery of the wheel rim and having channeled side arms projecting at right angles thereto along the sides of said wheel rim, said side arms being twisted so as to bring the same in different transverse planes on opposite sides of the transverse plane of said tread portion, and bolts extending from an arm of one bar to an arm of an adjacent bar located on the opposite side of the wheel rim.

4. In a vehicle wheel, a series of tractor bars, each bar being formed flat on its inner side, each bar consisting of a tread portion arranged diagonally across the wheel rim and arms at each end of the tread portions twisted so as to cause the same to lie flatly against the sides of the wheel rim, said arms also lying at different transverse planes on opposite sides of the plane of said tread portion, and securing bolts extending from an arm of one bar to an arm of an adjacent bar located on the opposite side of the wheel rim.

In testimony whereof, we have hereunto set our hands this 1st day of February 1916.

WILLIAM L. BRALEY.
HENRY N. FAAS.

Witness:
CHAS. I. WELCH.